(12) United States Patent
Oldani et al.

(10) Patent No.: US 6,998,030 B2
(45) Date of Patent: Feb. 14, 2006

(54) BIPOLAR ASSEMBLY FOR FILTER-PRESS ELECTROLYZER

(75) Inventors: Dario Oldani, Milan (IT); Peter Fabian, Gelnhausen (DE); Fulvio Federico, Piacenza (IT); Antonius Fischer, Gelnhausen (DE); Leonello Carrettin, Milan (IT)

(73) Assignee: Uhdenora Technologies S.r.l., (IT)

( * ) Notice: Subject to any disclaimer, the term of this patent is extended or adjusted under 35 U.S.C. 154(b) by 391 days.

(21) Appl. No.: 10/466,782

(22) PCT Filed: Feb. 28, 2002

(86) PCT No.: PCT/EP02/02204

§ 371 (c)(1),
(2), (4) Date: Jul. 16, 2003

(87) PCT Pub. No.: WO02/068718

PCT Pub. Date: Sep. 6, 2002

(65) Prior Publication Data

US 2004/0216994 A1 Nov. 4, 2004

(30) Foreign Application Priority Data

Feb. 28, 2001 (IT) .......................... MI2001A0401

(51) Int. Cl.
*C25B 9/20* (2006.01)
*C25B 1/26* (2006.01)
*C25B 1/08* (2006.01)

(52) U.S. Cl. ....................... 204/253; 205/618; 205/628

(58) Field of Classification Search ..................... None
See application file for complete search history.

(56) References Cited

U.S. PATENT DOCUMENTS

| | | | |
|---|---|---|---|
| 1,464,840 A | | 8/1923 | Allan |
| 4,111,779 A | * | 9/1978 | Seko et al. ................. 204/255 |
| 4,279,731 A | * | 7/1981 | Pellegri ...................... 204/254 |
| 4,339,323 A | | 7/1982 | Dilmore et al. |
| 4,389,298 A | * | 6/1983 | Pellegri ...................... 204/288 |
| 4,557,816 A | * | 12/1985 | Yoshida et al. ............. 204/255 |

(Continued)

FOREIGN PATENT DOCUMENTS

JP          07-252682          10/1995

OTHER PUBLICATIONS

Patent Abstracts of Japan, (1 page) 06069964 Mar. 14, 1994 Oguro Keisuke Water . . . Electrolyte Membrane.

*Primary Examiner*—Roy King
*Assistant Examiner*—Harry D. Wilkins, III
(74) *Attorney, Agent, or Firm*—Charles A. Muserlian

(57) ABSTRACT

A bipolar assembly for filter-press type electrolyzers is described comprising a single sheet, whose two faces work respectively as anodic and cathodic wall, characterised by a design of perimetral flanges which greatly simplifies its construction enhancing its reliability. The peripheral flanges are made of a first flange obtained by folding the peripheral portion of the single sheet and of a second flange formed by a rod or a tube with quadrangular section or, alternatively, the first and second flange are pre-formed by folding of adequate strips subsequently fixed to the single sheet. The electrolyser resulting from the assemblage of a multiplicity of assemblies of the invention is particularly suited to the process of electrolysis of hydrochloric acid solutions carried out with chlorine-evolving anodes and oxygen-consuming cathodes.

20 Claims, 9 Drawing Sheets

U.S. PATENT DOCUMENTS

| | | | |
|---|---|---|---|
| 4,578,885 A * | 4/1986 | Dang et al. | 204/255 |
| 4,584,080 A | 4/1986 | Staab et al. | |
| 4,767,519 A | 8/1988 | De Nora | |
| 4,877,499 A * | 10/1989 | Beaver et al. | 205/511 |
| 4,894,128 A * | 1/1990 | Beaver | 205/513 |
| 5,484,514 A * | 1/1996 | Katayama | 204/255 |

* cited by examiner

BIPOLAR ASSEMBLY FOR FILTER-PRESS ELECTROLYZER

This application is a 371 of PCT/EP02/02204 filed Feb. 28, 2002.

DESCRIPTION OF THE INVENTION

The present invention relates to a new bipolar assembly for filter press electrolyser.

Hydrochloric acid, HCl in the following description, is an important by-product generated in a large amount by a number of industrial processes, among which particularly important are the synthesis of vinyl chloride by dichloroethane pyrolisis, followed by polymerisation to polyvinylchloride (PVC), and of several isocyanates which reacted with glycoles permit to obtain the family of polyurethanes, increasingly employed for the production of paints and of expanded cell materials prized for thermal insulation systems, such as insulation for refrigerators and walls of buildings. The continuous world-wide expansion of the production capacity of PVC and is polyurethanes is leading, and will lead always more in the next future, to such an over-saturation of the HCl market as to jeopardise the construction of new plants. To get unrestrained from the conditions of such a difficult market, inside the units of vinyl chloride synthesis units of oxychlorination are installed since long ago, in which the pyrolisis-generated HCl is reacted with ethylene and oxygen with production of dichloroethane which is sent back to the pyrolisis. A closed HCl loop is thus generated, involving however some problems of safety (possibility of forming explosive mixtures due to the use of oxygen) and of generation of by-products of difficult disposal.

Lately also the HCl coming from isocyanate production is sent to the oxychlorination units in case the two plants, the PVC and the isocyanate/polyurethane one, are built in reasonable proximity. This solution is not particularly appreciated by the isocyanate plant managers, as with this integration their production is practically made dependent from the one of PVC both in terms of planned shut-downs (usually associated to the cyclicity of PVC market which is by no means coincident with the one of polyurethane market) and of unexpected shut-downs.

Even if the industrial situation has been so far capable of facing the problems of destination of by-product HCl, it can however be said that, in general, the current asset of the plants is far from being satisfactory, and that a demand for innovative process alternatives undoubtedly exists. One of these alternatives, particularly interesting, is represented by HCl electrolysis with generation of new chlorine to be recycled to the main plant.

Such electrolysis can be carried out according to two technologies respectively based on the utilisation of gaseous hydrochloric acid (this being the physical state in which HCl is formed by dichloroethane pyrolisis and isocyanate synthesis) or of an aqueous solution of HCl obtained by sending the gaseous HCl to a water-fed absorption column. Such column is an equipment normally present in the plants that generate HCl as a by-product, since the aqueous solution practically represents the only way through which commercialisation can be effected.

The former technology, based as already said on the direct use of gaseous acid and disclosed in the PCT publication WO95/44797 filed by DuPont/USA, is still in a phase of applied research as some important problems essentially associated to the extreme aggressiveness of the system are waiting to find a reliable solution.

The latter technology, making use of aqueous solutions of acid (known as Hoechst-Bayer-Uhde process), has been applied in some industrial realisations, but failed to obtain the potential customers' awaited recognition. The reasons for this substantial disappointment lie fundamentally in the high energy consumption, approximately 1500 kWh/ton of chlorine at a current density of 4000 Amps/m$^2$, mainly due to the free energy associated to the reaction which converts HCl to chlorine and hydrogen as indicated in the following scheme:

$$2HCl \rightarrow Cl_2 + H_2$$

A further reason, not secondary, is given by the high capital investment required by the electrolysis cells whose bipolar plates must be made with sheets of gas-impermeable graphite, dangerously fragile, or with composite sheets obtained by pressing a mixture of powders of graphite and a chemically inert polymeric binder, usually a fluorinated polymer, at high temperature.

In order to partially overcome these problems the replacement of the hydrogen evolving cathode with an oxygen consuming one has been proposed, for instance by General Electric Co.

In this case, the overall electrochemical reaction results to be:

$$2HCl + \tfrac{1}{2}O_2 \rightarrow Cl_2 + H_2O$$

The corresponding free energy results substantially lower compared to the one of the reaction with hydrogen evolution and this entails a diminution of the electric energy consumption down to 1000–1100 kWh/ton of chlorine. The load of the capital investment remains however unchanged, still high as the construction materials are still those based on graphite or graphite composites. A relevant step towards the conditions of economic feasibility is disclosed in U.S. Pat. No. 5,770,035: the process of electrolysis; of hydrochloric acid aqueous solutions incorporating the oxygen-consuming cathode is carried out in a cell whose cathodic and anodic compartment are both constructed with the same metal, and in particular a valve metal such as titanium or alloys thereof. A multiplicity of cells or of bipolar assemblies, stacked according to the arrangement known as filter-press constitutes the electrolyser which is the true industrial productive unit.

According to the more conventional design the two walls of the cathodic and anodic compartment of two adjacent cells can be put in mechanical and electrical contact either by means of a suitable compression (a concept known to the experts of the field as "single cell") or through a connection by suitable clamping elements, such as nuts and bolts or welds (bipolar assemblies). In this last case, the fact that the cathodic and the anodic compartment are made with the same metal facilitates substantially the manufacturing procedures and more interestingly makes possible a new type of design in which a cathode and an adjacent anode are separated by a single wall whose two faces cover the function of the two separated and adjacent walls of the traditional technology. This type of construction minimises the employment of expensive material such as titanium and alloys thereof with an undeniably relevant economic advantage, and is outlined in very general terms in U.S. Pat. No. 5,770,035.

Nevertheless a constraint to the adoption of this type of design is given by the need that the two cathodic and anodic compartments be provided with peripheral flanges allowing to seal the same, in co-operation with suitable gaskets, hindering the leaking of the process fluids. According to the known manufacturing procedures the peripheral flanges are in fact obtained either by press-shaping or by folding of the sheets that constitute the compartment walls: such operation gives in general satisfying results with low percentages of rejects for insufficient planarity or mechanical defects since each wall is worked to form only its own flange, cathodic or anodic respectively. Conversely, in the case of the single wall of separation of two cathodic and anodic compartments, the wall must be subjected, operating with the known procedures, to a double forming since both flanges, cathodic and anodic, are necessarily parts of the same wall. The double forming, independently of the fact that it be carried out by press-shaping or by folding, introduces high mechanical stresses in the material with frequent unacceptable planarity and/or defects such as fractures. It thus exists a considerable need to identify designs and manufacturing techniques that allow to produce with good reliability bipolar assemblies for filter-press electrolysers wherein the separation wall of adjacent cathodic and anodic compartment is unique and provided with two peripheral flanges, cathodic and anodic characterised by high planarity and absence of mechanical defects.

Under a first aspect, the present invention describes a design of bipolar assemblies comprising a single separating sheet with the dual function of anodic wall and cathodic wall made of corrosion resistant metal or metal alloy, and provided with an anodic perimetral flange and a cathodic perimetral flange; at least one of said perimetral flanges is made by a preformed element, and is not made out of press-shaping or folding the separating wall.

In a preferred embodiment the cathodic and the anodic perimetral flange are obtained by combining the folding of the peripheral portion of the sheet with a frame made out of a rod or a tube, both having a quadrangular section, made of a material of equivalent type as that of said sheet.

In another preferred embodiment, one of the flanges is obtained by folding the peripheral portion of the sheet, and the other is a pre-formed flange welded to the sheet itself: a reinforcing element is preferably interposed between the two flanges. In another preferred embodiment, the anodic perimetral flange and the cathodic one constitute a generally U-shaped pre-formed integral element, welded to said separating sheet; preferably, a reinforcing element is interposed between the anodic and the cathodic peripheral flange. The pre-formed integral element is obtained by folding of a second sheet, or by welding of two preformed flanges. Under another aspect the invention is directed to a method of catalytic activation of a bipolar assembly comprising at least one electrode, and preferably a couple of electrodes, fixed to the two anodic and cathodic faces of the sheet. According to a preferred embodiment, said bipolar assembly subjected to catalytic activation is a newly manufactured assembly.

According to a further preferred embodiment, said bipolar assembly is a previously catalysed assembly already operated in an electrolyser, whose catalytic activation, exhausted, is restored by reactivation.

Under another aspect, the invention is directed to an electrolyser comprising a multiplicity of bipolar assemblies according to one of the above described embodiments.

This type of construction, although suited to many applications of industrial interest, results particularly advantageous in the case of electrolysis of aqueous solutions of hydrochloric acid employing oxygen-consuming cathodes in which the walls of the adjacent cathodic and anodic compartments consist of a single sheet of valve metal, for instance titanium or titanium alloy.

FIG. 1 represents a cross-section of a bipolar assembly in which the two walls, anodic and cathodic, are separated and mutually fixed and the perimetral flanges are realised by folding of each wall as disclosed in the prior art.

FIG. 2 outlines the cross-section of a bipolar assembly whose anodic and cathodic walls are made of a single sheet and the two perimetral flanges are realised following the procedures of the prior art.

FIG. 3 shows the cross-section of a bipolar assembly whose anodic and cathodic walls are made of a single sheet and the two perimetral flanges are manufactured, according to a first embodiment of the invention, respectively by the folding of the peripheral portion of the sheet and with a rod or tube, both having quadrangular section, worked in such a way as to form a frame and made of a material of equivalent type as the one of the single sheet.

FIG. 4 reports the cross-section of a bipolar assembly whose walls are made of a single sheet and the two perimetral flanges are manufactured, according to a second embodiment of the invention, respectively by folding of the peripheral portion, of the sheet and by welding of a pre-formed flange of a material equivalent to the one of the sheet.

Figure 3:
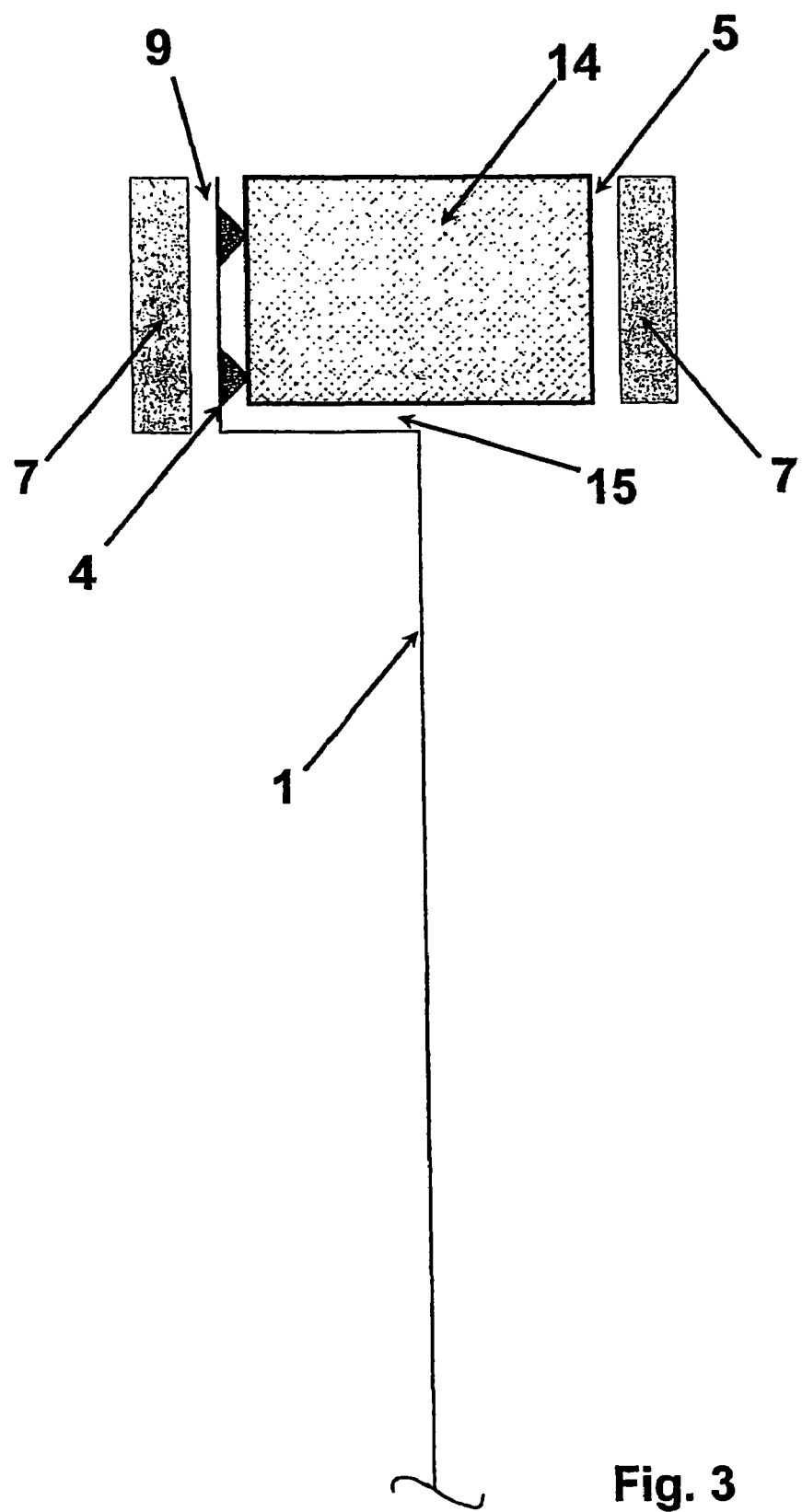
Figure 7:
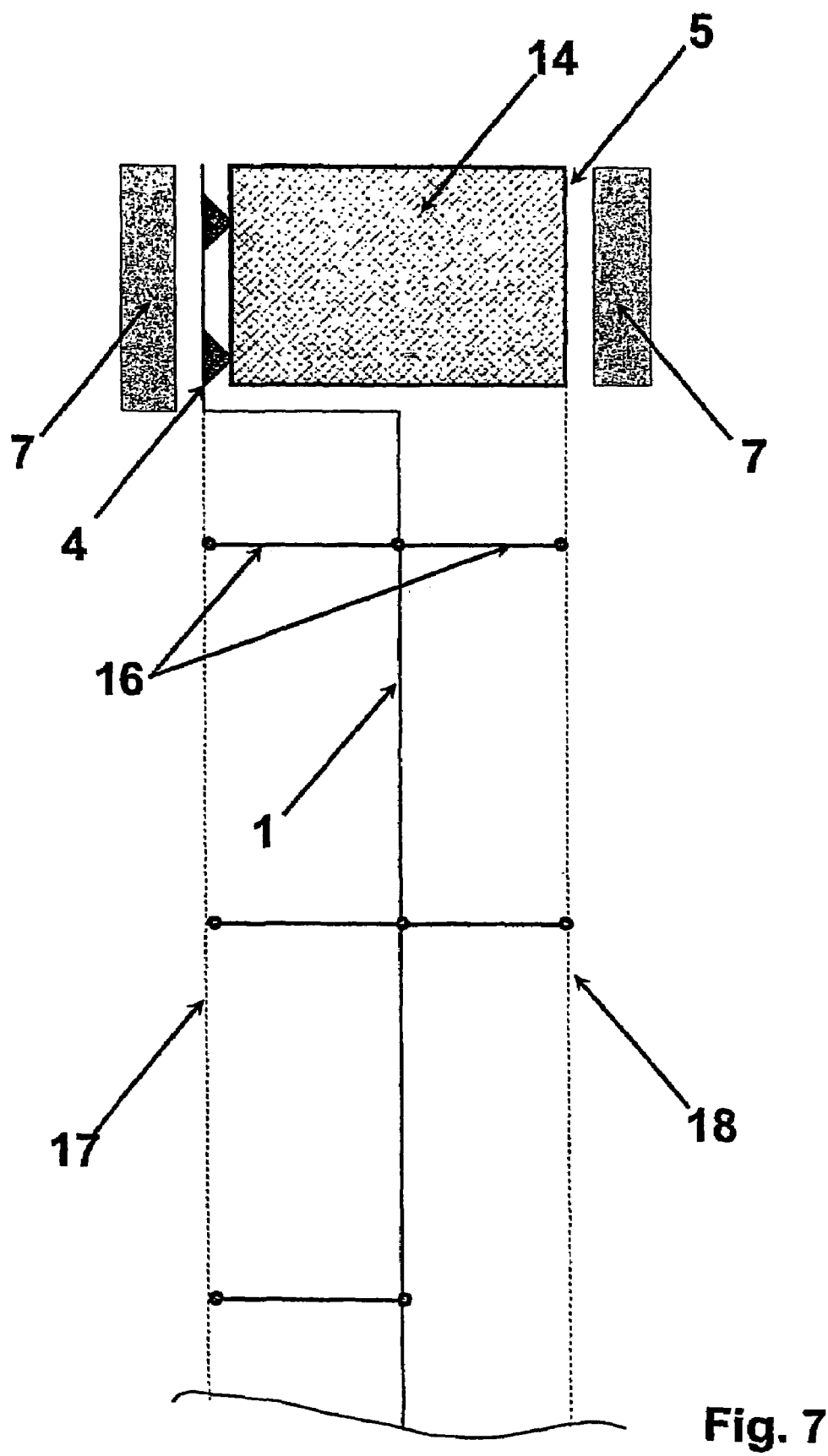

FIG. 7 outlines the assembly of FIG. 3 completed with supports and electrodes in form of punched or expanded sheets or meshes.

Figure 8A:
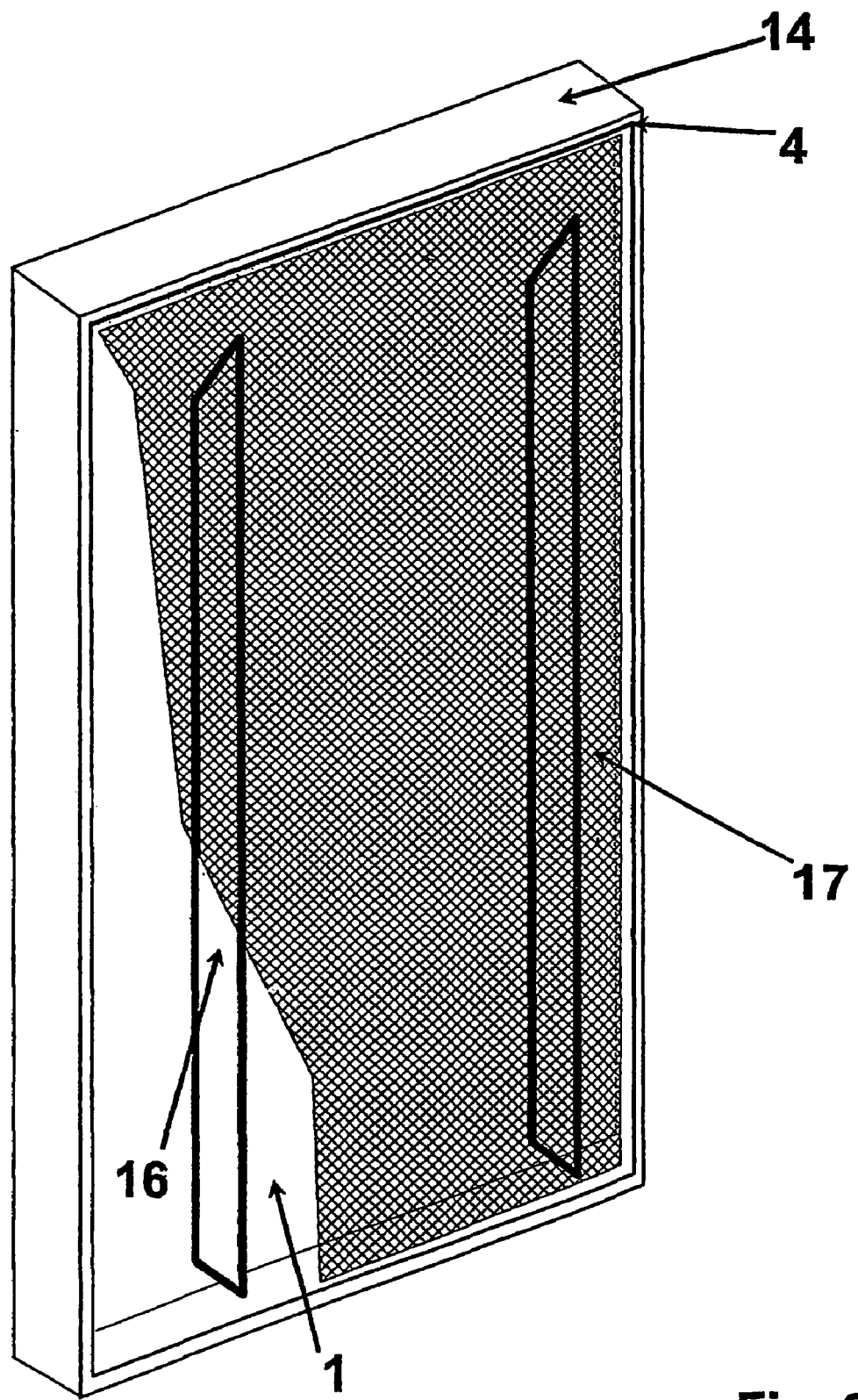
Figure 8B:
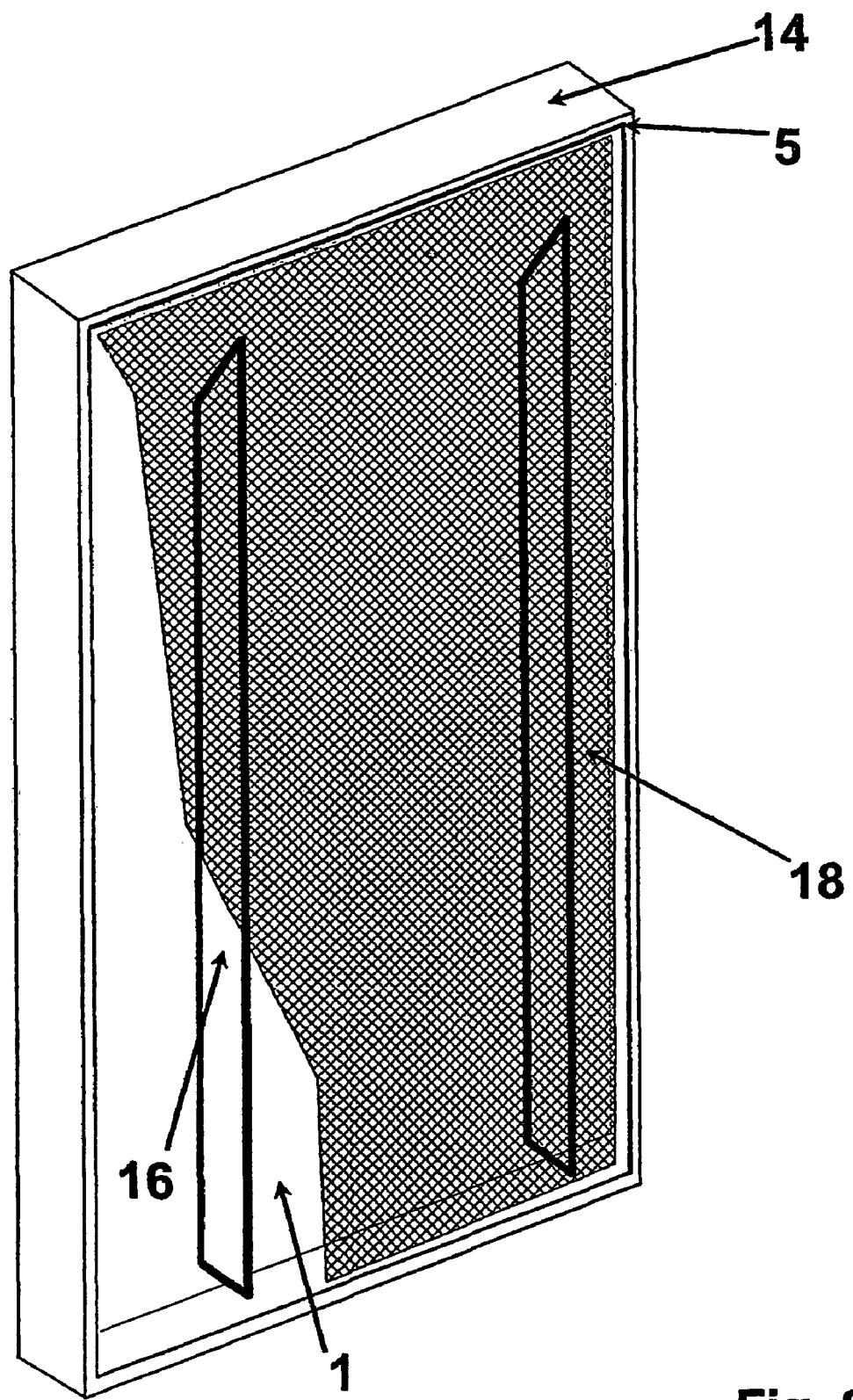

FIGS. 8A and 8B reproduce a three-dimensional image of the assembly of FIG. 7 according to the views from the two sides.

Hereafter are described a few embodiments of the invention, whose main objective is a new simplified and more reliable design of bipolar assembly for filter-press electrolyser comprising a single sheet having the dual role of anodic and cathodic wall, made of a metal or metal alloy selected from the group of corrosion resistant metals or metal alloys: this kind of design, while being particularly advantageous for electrolysers suitable for the electrolysis of hydrochloric acid aqueous solutions, is nevertheless of general utility also for electrolysers that can be manufactured with multiplicities of bipolar assemblies comprising a single wall of separation between anodic and cathodic compartments. Merely as an example of further application the electrolysers for alkaline water electrolysis are cited.

Figure 1:
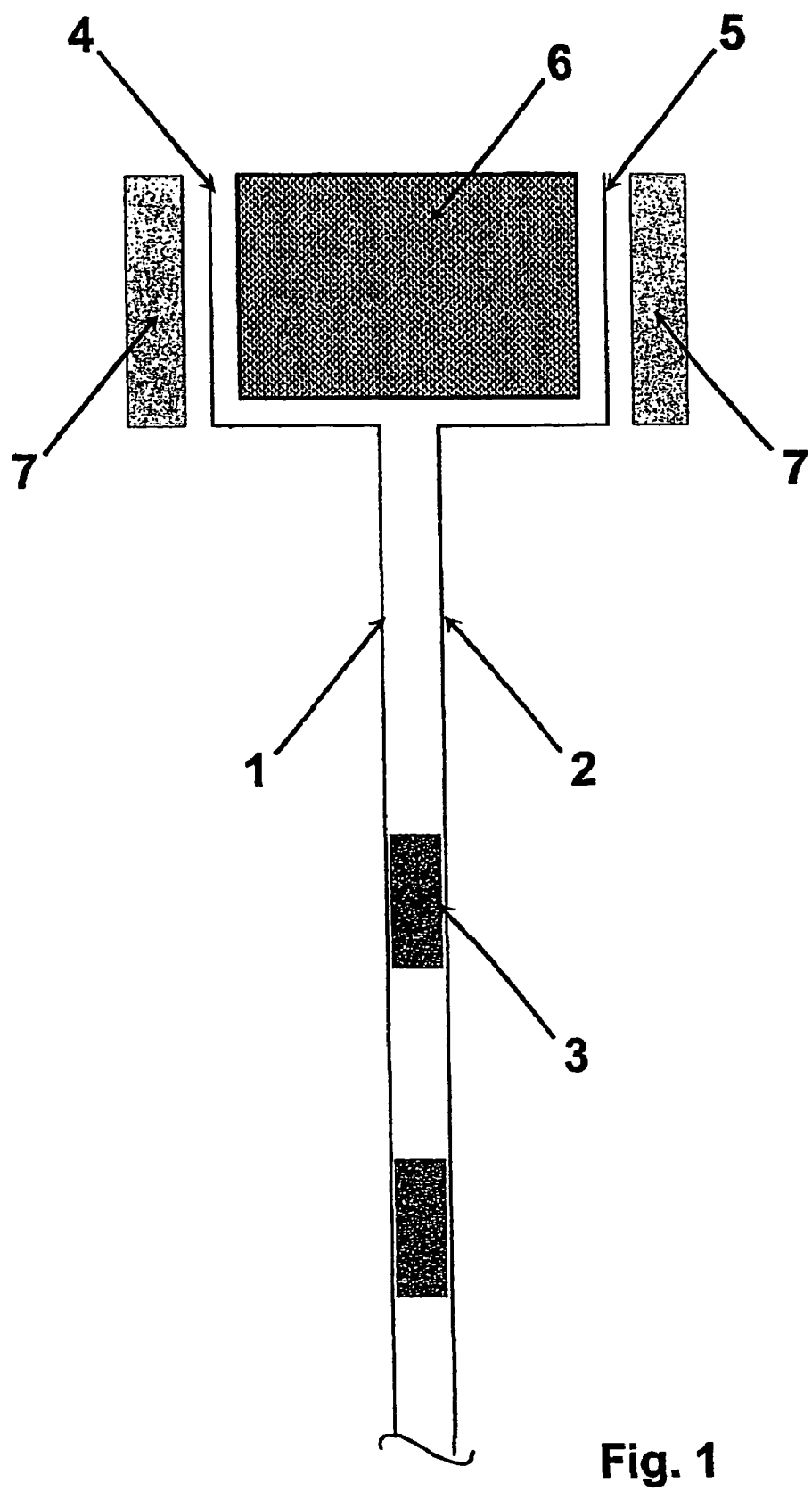
Figure 2:
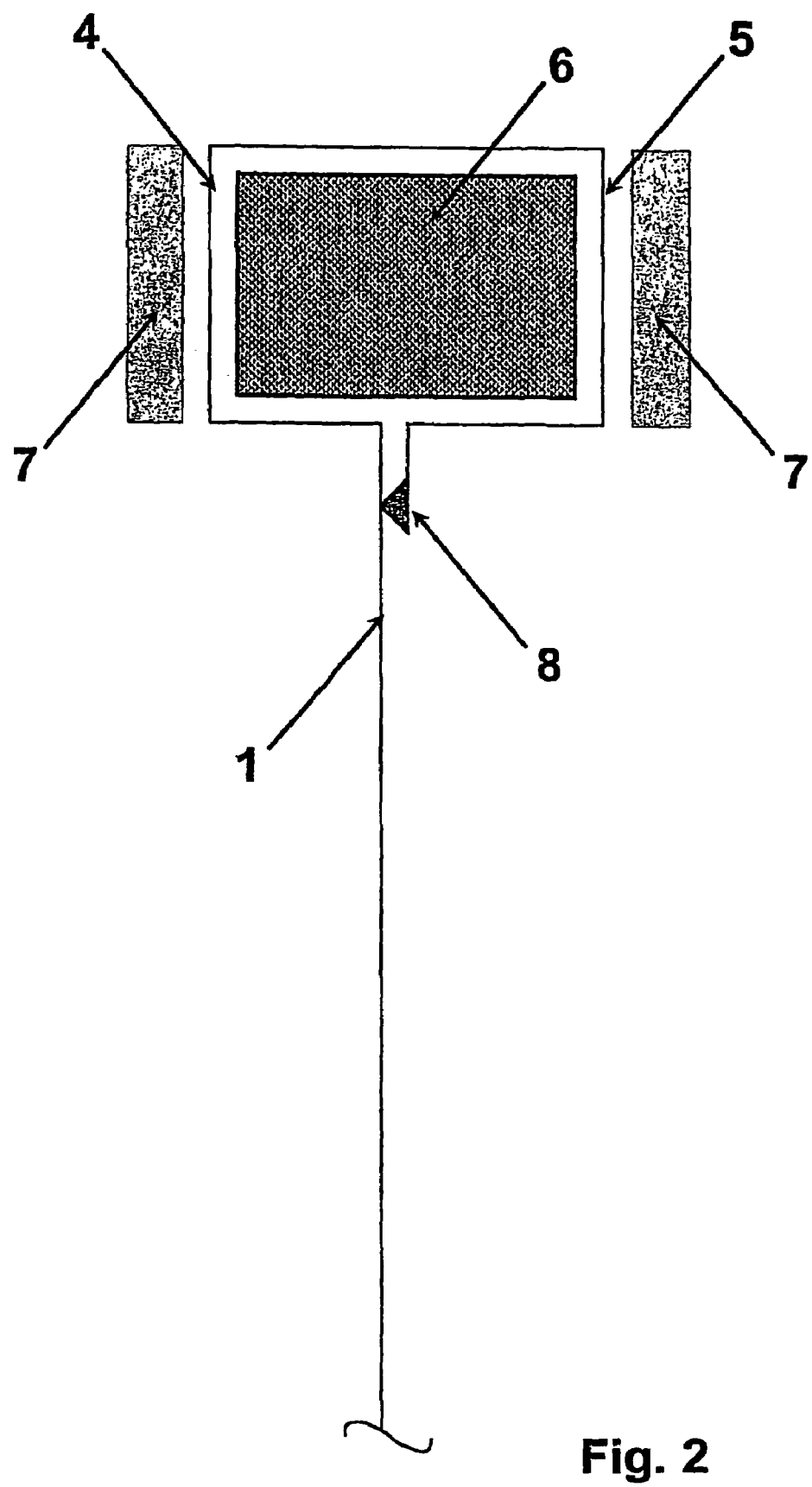

FIG. 1 and FIG. 2 show two cross-sections of a bipolar assembly corresponding to the design according to the prior art in case the anodic and cathodic walls are two distinct sheets and a single sheet respectively. In particular, in FIG. 1 the essential constructive elements of the assembly are indicated, wherein 1 and 2 are the separate anodic and cathodic wall, 3 the welds providing to ensure the mechanical stability and the electrical continuity needed to allow the passage of the electric current, 4 the surface of the anodic flange, 5 the surface of the cathodic flange, 6 a perimetral reinforcing element made of a metal or plastic material rod suitable to guarantee that the flanges may be compressed without deformations or deflections taking place, 7 the gaskets, respectively anodic (at the left) and cathodic (at the right), which seal the perimetral surface of both flanges under compression hindering the leakage of the fluids contained in the anodic and in the cathodic compartments.

In FIG. 2 an embodiment according to the prior art is outlined in case the two walls of the adjacent anodic and cathodic compartments are constituted by a single sheet. Based on this kind of construction the peripheral portion of the single, sheet is subjected to a sequence of folds, at least five or preferably six as shown in the figure, around the perimetral reinforcing element to form the two flange surfaces, anodic and cathodic. In particular, 1 is the single sheet covering at the same time the roles of walls 1 and 2 in FIG. 1, 4 is the anodic flange surface, 5 is the cathodic flange surface, 6 is the perimetral reinforcing element with the same functions of the one of FIG. 1, 7 are the anodic and cathodic gaskets, 8 is the weld for fixing the free edge of the folded portion of sheet having the aim of preventing the penetration of the fluid from the cathodic compartment (at the right hand side in the figure). This fluid might be corrosive and the contact thereof with the perimetral reinforcing element 6 would force it to be built of a corrosion resistant material and thus intrinsically expensive. If the element 6 is safely protected from the contact with aggressive fluids, the construction material may be cheap carbon steel.

The assembly of FIG. 2 is certainly advantageous with respect to the more common type of construction according to the prior art of FIG. 1 as it makes use of a single sheet of expensive material, e.g. titanium and alloys thereof for the case of hydrochloric acid solution electrolysis, allowing to eliminate the welds 3 of FIG. 1 of mechanical assembly and electrical continuity. The assembly is however penalised by the multiple folding needed to form the two anodic and cathodic flange surfaces making use of the same peripheral portion of sheet this kind of folding is very complex to perform and induces high mechanical stresses with high risk of defect formation and consequent unacceptable percentage of piece rejection in phase of production quality control.

FIG. 3 shows a first embodiment according to the invention of the assembly wherein the walls of the two adjacent anodic and cathodic compartments consist of a single sheet 1 and the peripheral portion of said single sheet 1 is folded so as to form the surface 4 only of the anodic flange (as preferred in the case of hydrochloric acid solution electrolysis, without however excluding the alternative wherein the only flange surface that is formed is the cathodic surface), and said single surface is welded at 9 to a frame 14 constructed with corrosion resistant material. In particular, frame 14 is made of a rod or preferably of a tube with polygonal section 4 preferably quadrangular, to decrease the amount of material resistant to corrosion; and thus expensive, and moreover the weld 9 can optionally be a double weld as shown in the figure to ensure a higher reliability towards the possible leakage of the fluid contained in the cathodic compartment to the external environment.

This first constructive alternative according to the invention allows to maintain the mechanical folding stresses within very low levels, certainly not able to generate defects in the material of the sheet. The quality of the weld or welds 9 and suitable speeds and production costs are guaranteed by adequate clamping equipment for the various pieces and by the modern automated welding techniques, in particular the laser technique. Examining FIG. 3 it can be noticed that the folded sheet-frame assembly creates a crevice 15 in which the process liquid could infiltrate and stagnate: this situation does not cause in general any particular inconvenience, with the exception of the specific case in which such liquid contains chlorides and in particular it is acidic and at a temperature higher than ambient, as effectively happens in the case of hydrochloric acid solution electrolysis, in this situation a corrosive attack confined within the crevice zone may in fact develop. The protection against this type of attack is effected either selecting a material characterised by higher resistance, for instance in the mentioned case of hydrochloric acid solution electrolysis the use of titanium–0.2% palladium alloy instead of titanium, or applying a thin protective film to the crevice zone. These films, well known in the electrochemical technology, generally contain small amounts of noble metals, such as platinum, ruthenium or iridium, or oxides thereof.

The above cited protective measures don't constitute an added production cost to the assembly of FIG. 3: they must in fact be adopted in any case to keep away the risks of corrosion on the surface of the flanges 4 and 5, whereon a very dangerous crevice could be formed due to a poor adhesion with the gaskets 7 normally arising from defects of the surfaces of the same flanges. In other words it can be said that the application of the suitable means for protecting the flange surfaces is carried out simultaneously with the application of the same means to the crevice zone 15 without particular added costs.

Figure 4:
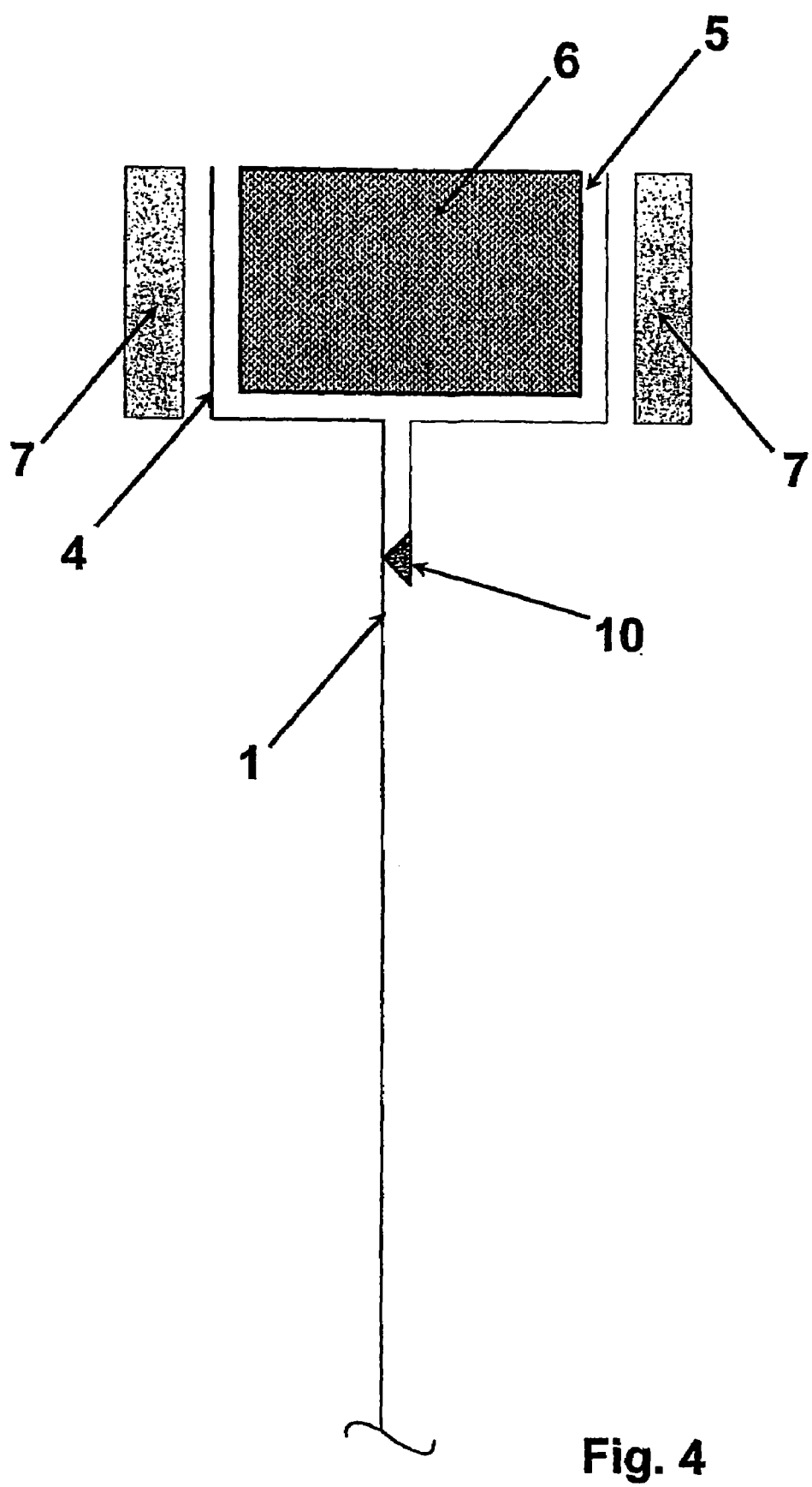

FIG. 4 shows a variation of other embodiment of FIG. 3 having the purposed of avoiding the use of the frame 14 made of a rod or tube with quadrangular section made with corrosion resistant material. The assembly always as a cross-section, comprises again the single sheet 1 with the peripheral portion folded to form only the anodic flange 4 as already seen in FIG. 3, with the difference that the frame 14 of corrosion resistant material is replaced by a further pre-formed flange 5 which acts as cathodic flange and is welded to the sheet 1 through weld 10, performed with an automated procedure, preferably with the laser technology. Optionally the weld 10 can be realised as a double weld (not shown in the figure). The perimetral reinforcing element does not come in contact with any corrosive fluid and is therefore manufactured with a low cost material, e.g. carbon steel.

In comparison with the assembly of FIG. 3, the embodiment of FIG. 4 allows a saving of expensive material, being on the other hand more delicate as regards the final planarity of the piece, important to facilitate the assemblage of the electrolysers.

Figure 5:
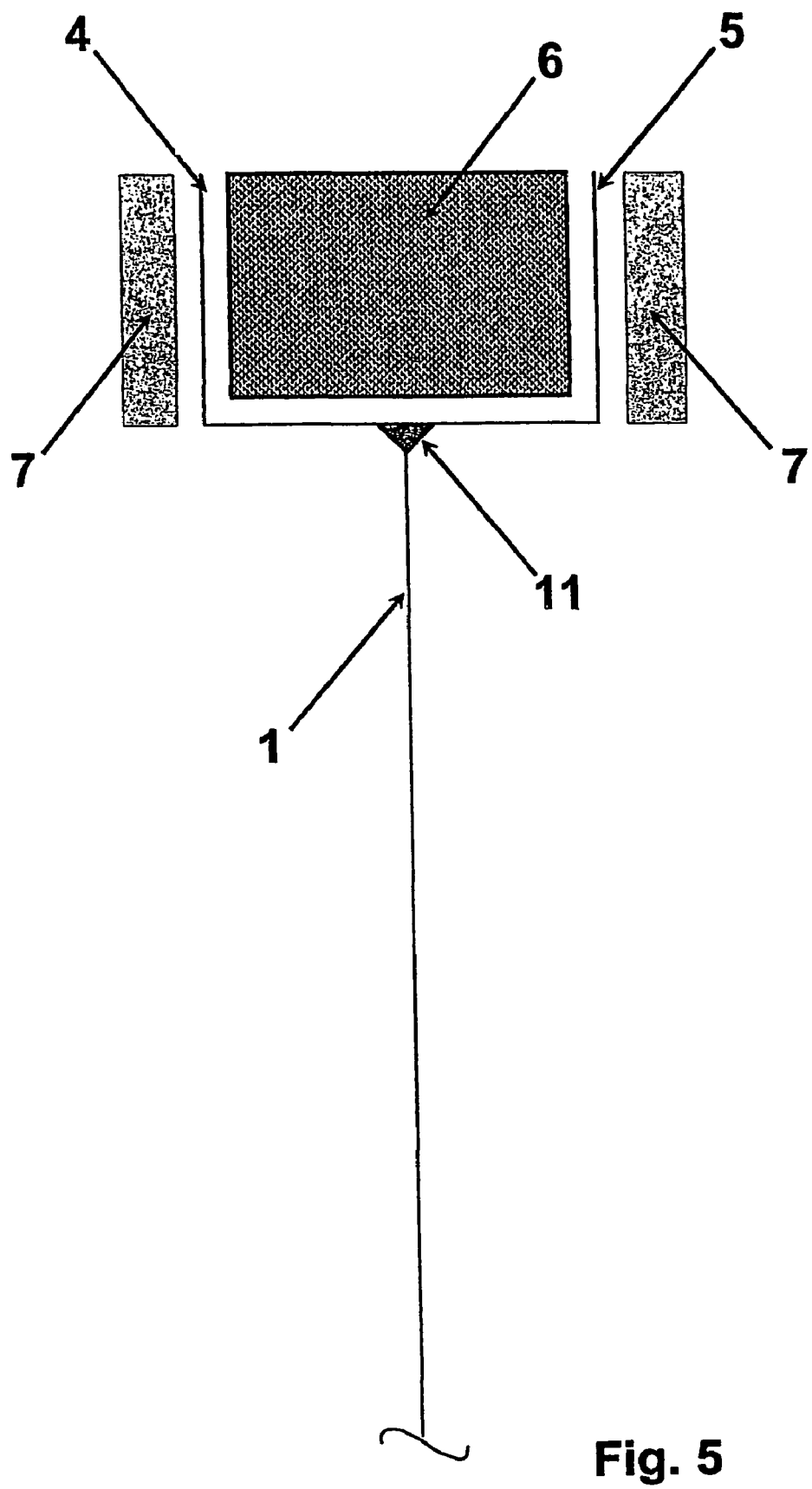
FIG. 5 illustrates a further embodiment of the invention in which the sheet having the dual role of anodic and cathodic wall, is not folded in its peripheral portion and is welded to a single pre-formed frame with U-shaped section of a material equivalent to the one of the sheet.

A further constructive alternative of the assembly of FIG. 4 is given in FIG. 5 where the single sheet 1 is not folded in its peripheral portion and the two surfaces of the anodic 4 and cathodic 5 flanges are obtained by means of a pre-formed perimetral element with U-shaped section that is welded to the single sheet with the weld 11. Similarly to what occurs for the assembly of FIG. 4 the construction material of the reinforcing element 6 is not critical: carbon steel is totally suitable.

Compared to the assembly of FIG. 4, the solution illustrated in FIG. 5 is characterised by the same reduced amount of expensive material and in addition it permits to obtain more easily a good final planarity. Conversely, the execution of weld 11 is relatively critical in order to obtain a high quality weld in fact it is necessary that the edge of the sheet be straight and free from imperfections, such as cutting barbs, and that the edge of the sheet and the preformed piece with, U-shaped section be perfectly adhered reciprocally during the execution of the welding, which must be of the automated type, such as the laser technology. A. "physiologic" inconvenience of the assembly of FIG. 5 is given by the impossibility of effecting the weld 11 as a double weld: however, defects of the weld 11, such as through-thickness porosities, would determine fluid passage between the two anodic and cathodic adjacent compartments, tolerable at least in part, and not a leakage towards the external environment.

Figure 6:
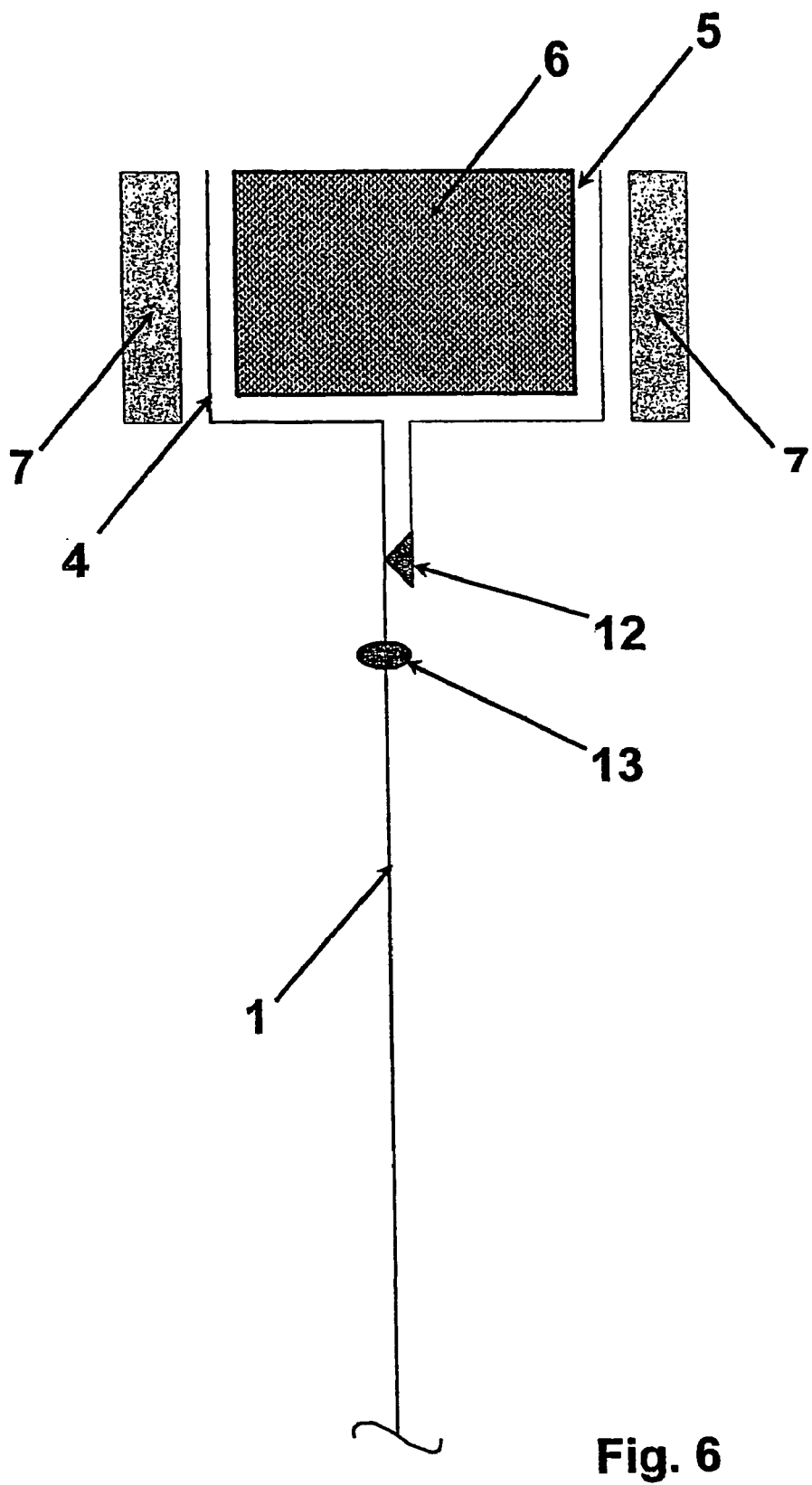
FIG. 6 shows a variant of the embodiment of FIG. 5 in which the pre-formed frame is made of two shells welded together so as to form a piece with U-shaped section provided with an inner edge whereto the sheet is welded in its turn.

Finally, FIG. 6 outlines an embodiment of the invention as a cross-section wherein the perimetral piece with U-shaped section discussed in the context of FIG. 5 is pre-manufactured by welding two shells obtained from two metal strips with only two foldings: the assembling weld 12 of the two shells can be single or it can be double in case one wants to ensure a high reliability against infiltrations. The so pre-manufactured element is worked for instance in a press to obtain a high planarity. The piece presents a free edge protruding respect to the weld 12: this edge, whose requirements are to be straight and free of defects such as cutting barbs, is welded head-to-head (weld 13) to the edge of the sheet 1.

This type of embodiment is less advantageous compared to the one described in FIG. 5 essentially for the additional steps represented by the execution of the weld 12 and the pressing to restore the piece planarity required after the deformations induced by the welding procedure: on the other hand the press working ensures an adequate planarity also after effecting the weld 13. This last weld, which is inevitably single as weld 11 of the assembly of FIG. 5, is however easier to effect (the two edges to be joined are in a head-to-head position, while in the assembly of FIG. 5 the surface of the perimetral piece with U-shaped section and the edge of the sheet are positioned at 90°). This ease of execution guarantees a high probability of absence of defects, which on the other hand as above said are at least in part tolerable.

As in the previous cases, also in the present one it is largely preferred that the welding be of automated type, preferably with laser technology.

The assemblies outlined in FIGS. 3, 4, 5 and 6 must be completed with the relative anodes and cathodes: these are normally constituted by punched or expanded sheets or meshes of corrosion resistant metal or metal alloy, preferably provided with a thin superficial film of electrocatalytic material.

FIG. 7 reproduces a cross-section of the assembly in FIG. 3 wherein the anode 17 and the cathode 18 have been installed by fixing, e.g. welding, on adequate supports 16 in their turn connected to the wall 1 preferably by welding. For a better understanding of the structure the assembly of FIG. 7 is reproduced in a three-dimensional representation in FIG. 8A (view from the anode side) and 8B (view from the cathode side).

In the prior art it is usual to apply the film of electrocatalytic material on the punched or expanded sheets or meshes 17 and 18 prior to fixing the same to the supports 16 the reason on which this procedure is based is given by the temperature required for the application of the electrocatalytic film, frequently in the range of 400–500° C. If the sheets or meshes were fixed to the supports 16 prior to the application of the electrocatalytic film, the subsequent application would necessarily submit the whole assembly to the temperatures of 400–500° with the certainty of important distortions (planarity losses) arising from the different thermal expansion coefficients of the various construction materials (anodic compartment material, cathodic compartment material, perimetral reinforcing element material). On the other hand, the fixing by welding of the sheets or meshes previously provided with the electrocatalytic film results rather critical as in the welding zones the electrocatalytic film material is embedded in the molten zone with possible contamination and consequent generation of defects such as porosity and/or brittleness.

While this procedure—application of the electrocatalytic film to the sheets or meshes and subsequent welding thereof to the supports 16 of the assemblies—is tolerable in the construction phase of new assemblies, it results very onerous in the so called "reactivation" phase, which is necessary to undertake periodically as the electrocatalytic films are subject to a progressive consumption during the electrolysis. As the electrocatalytic films ensure a lower operative voltage, and thus a lower electric energy consumption; it is thereby necessary to proceed to their renewal.

The fact of not being able to expose the assemblies to the high temperatures required by the application of electrocatalytic materials implies that the exhausted sheets or meshes must be detached from the supports 16, an operation which is time consuming and which often causes such damages to the sheets or meshes to force their replacement The above mentioned problem concerns the structures outlined in FIGS. 1, 2, 4, 5 and 6, but not the structure of FIG. 3 whose different parts are all produced with the same material. Thus the assembly of FIG. 3 is characterised by being made of parts having the same thermal expansion coefficient and thus the assembly may be exposed to high temperatures without risks of distortion. The important consequence of this characteristic is that the new assemblies may be equipped with sheets or meshes free of electrocatalytic films (with a substantial simplification of the welds to the supports 16): in a subsequent phase the whole assemblies are subjected to the procedure of application of the electrocatalytic films to the sheets or meshes with the relative high temperatures. The "reactivation" of exhausted assemblies is effected likewise: in particular, the exhausted assemblies are treated to eliminate the remnants of the old electrocatalytic films, e.g. by means of sandblasting or chemical washing, then subjected to the application of new films according to a procedure that matches exactly the one utilised for new assemblies.

A further advantage of the application of the electrocatalytic films to the assemblies including the punched or expanded sheets or meshes is given by the absence of damages to the films necessarily induced by the fixing welds on the sheets or meshes previously provided with the film according to the prior art.

What is claimed is:

1. A bipolar assembly for an electrolyzer of the filter-press type comprising a single sheet of metal or metal alloy selected from the group of corrosion resistant metals and metal alloys, the two sides of said single sheet acting respectively as anodic wall and and as cathodic wall, said single sheet being provided with two perimetral flanges wherein at least one of said flanges is a pre-formed element not integral to said single sheet, wherein said at least one flange made of a pre-formed element is made of a frame formed by a rod or tube with polygonal section of metal or metal alloy of the same group of metals or alloys of said single sheet, and that the other flange is fixed to said frame.

2. The assembly of claim 1 wherein said other flange is fixed to said frame by continuous welding.

3. The assembly of claim 2 wherein said continuous welding is a laser welding.

4. The assembly of claim 1 wherein said perimetral flanges comprise one cathodic flange and one anodic flange.

5. The assembly of claim 4 wherein the construction materials of said flanges and said single sheet are selected from valve metals and alloys thereof.

6. The assembly of claim 5 wherein said anodic flange and said single sheet are made of titanium alloy and said cathodic flange is made of titanium.

7. The assembly of claim 5 wherein said cathodic flange, said anodic flange and said sheet are made of titanium and that at least one of said flanges is provided with a protective coating against crevice corrosion.

8. The assembly of claim 1 further comprising supports fixed to said sides of the single sheet and one anode and one cathode fixed in their turn to said supports, the anode and the cathode being made of punched or expanded sheets or meshes provided with films including electrocatalytic materials obtained by applying a paint containing precursor compounds of the electrocatalytic materials and by subsequent thermal treatment necessary to convert said paint to said materials wherein the application of said paint is effected on the sheets or meshes after their fixing on said supports and the whole assembly is subjected to said thermal treatment.

9. The assembly of claim 8 wherein it is a newly constructed assembly.

10. The assembly of claim 8 wherein it is an exhausted assembly.

11. An electrolyzer of the filter-press type suitable for electrolysis processes the improvement comprising that it is made of a multiplicity of assemblies of claim 1.

12. A process of electrolysis of an aqueous solution in an electrolyzer of the filter-press type, the improvement comprising that the electrolyzer comprises at least one bipolar assembly of claim 1.

13. The process of claim 12 wherein said aqueous solution is a hydrochloric acid solution, said electrolysis is carried out with anodes for chlorine evolution and with oxygen-consuming cathodes and that the metal or alloy of said perimetral flanges and of said single sheet is titanium or a titanium alloy.

14. The process of claim 12 wherein said electrolysis is an alkaline water electrolysis.

15. A bipolar assembly for an electrolyzer of the filter press type comprising a single sheet of metal or metal alloy selected from the group of corrosion resistant metals and metal alloys, the two sides of said single sheet acting respectively as anodic wall and as cathodic wall, said single sheet being provided with two perimetral flanges wherein at least one of said flanges is a pre-formed element not integral to said single sheet, wherein said at least one flange made of a pre-formed element is obtained by folding of a strip of metal or metal alloy of the same group of metals or alloys of said single sheet and is fixed to said single sheet by continuous welding, that the other flange is obtained by folding of said single sheet, and that between said at least one flange and said other flange a perimetral reinforcing element is interposed.

16. A bipolar assembly for an electrolyzer of the filter-press type comprising a single sheet of metal or metal alloy selected from the group of corrosion resistant metals and metal alloys, the two sides of said single sheet acting respectively as anodic wall and as cathodic wall, said single sheet being provided with two perimetral flanges wherein at least one of said flanges is a pre-formed element not integral to said single sheet, wherein said pre-formed element is formed by said two perimetral flanges constituting a single perimetral piece with U-shaped cross-section enclosing a perimetral reinforcing element.

17. The assembly of claim 16 wherein said perimetral piece is obtained by folding a strip of metal alloy of the same group of metals or alloys of said single sheet.

18. The assembly of claim 17 wherein said perimetral piece is fixed to said single sheet by continuous welding.

19. The assembly of claim 16 wherein said perimetral piece is provided with one edge.

20. The assembly of claim 19 wherein said perimetral piece is obtained by continuous welding of two pre-formed flanges, said edge is joined to said single sheet by continuous welding.

* * * * *